US007603980B2

(12) United States Patent
Watanabe

(10) Patent No.: US 7,603,980 B2
(45) Date of Patent: Oct. 20, 2009

(54) SENSOR ABNORMALITY DETECTING METHOD AND ELECTRONIC THROTTLE CONTROL APPARATUS

(75) Inventor: Shinji Watanabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 205 days.

(21) Appl. No.: 11/303,987

(22) Filed: Dec. 19, 2005

(65) Prior Publication Data

US 2007/0027609 A1 Feb. 1, 2007

(30) Foreign Application Priority Data

Jul. 28, 2005 (JP) .......................... P2005-218381

(51) Int. Cl.
*F02D 11/10* (2006.01)
*G06F 19/00* (2006.01)

(52) U.S. Cl. ......................... 123/399; 123/396; 700/79; 701/114; 701/107

(58) Field of Classification Search ................. 123/396, 123/399, 397, 198 D; 701/114; 700/79; 73/118.1
See application file for complete search history.

(56) References Cited

U.S. PATENT DOCUMENTS

| | | | | |
|---|---|---|---|---|
| 5,260,877 | A | 11/1993 | Drobny et al. | |
| 5,394,744 | A | 3/1995 | James et al. | |
| 6,109,239 | A * | 8/2000 | Watanabe | 123/396 |
| 6,751,544 | B2 | 6/2004 | Hashimoto et al. | |
| 6,805,094 | B2 * | 10/2004 | Hashimoto et al. | 123/396 |
| 2003/0183194 | A1 * | 10/2003 | Noguchi | 123/396 |

FOREIGN PATENT DOCUMENTS

| | | | |
|---|---|---|---|
| DE | 40 04 085 | A1 | 8/1991 |
| DE | 103 03 920 | A1 | 1/2004 |
| EP | 0 662 608 | B1 | 7/1995 |
| EP | 0 908 611 | A2 | 4/1999 |
| JP | 2000-130231 | | 5/2000 |
| JP | 2001-303976 | A | 10/2001 |

OTHER PUBLICATIONS

German Office Action dated Jan. 30, 2008.
Japanese Office Action dated Mar. 11, 2008.

* cited by examiner

*Primary Examiner*—Stephen K Cronin
*Assistant Examiner*—J. Page Hufty
(74) *Attorney, Agent, or Firm*—Sughrue Mion, PLLC

(57) ABSTRACT

An electronic throttle control apparatus includes first and second throttle position sensors that detect an opening of a throttle valve for adjusting an amount of supply air to an internal combustion engine, a throttle control unit that controls to drive the throttle valve, first and second accelerator position sensors that detect an operation amount of an accelerator pedal, and an ECU that calculates control parameters for the internal combustion engine on the basis of internal combustion engine operation information including an accelerator opening and a throttle opening and controls a throttle actuator such that a throttle opening position coincides with a target throttle opening position included in the control parameters. The ECU surely detects an abnormality in a sensor output due to contact failure or the like of the throttle position sensors and the accelerator position sensors. As a result, it is possible to provide an electronic throttle control apparatus that can prevent an unintended increase in the number of revolutions of the internal combustion engine, an engine trouble, and the like.

7 Claims, 12 Drawing Sheets

SENSOR ABNORMALITY DETECTING METHOD AND ELECTRONIC THROTTLE CONTROL APPARATUS

BACKGROUND OF THE INVENTION

1. Field of the Invention

The present invention relates to a sensor abnormality detecting method of detecting an abnormality in fluctuation in a sensor output signal due to contact failure of a sensor for detecting a control amount of a control object. In particular, the invention relates to an electronic throttle control apparatus including a sensor abnormality detecting unit that detects an abnormality of a throttle position sensor for detecting an opening amount of a throttle valve set in an intake pipe of an internal combustion engine for an automobile using the sensor abnormality detecting method.

2. Description of the Related Art

In an electronic control throttle system mounted on a vehicle, an opening of a throttle valve is detected by a throttle position sensor and a target opening of the throttle valve is set on the basis of an accelerator opening and an operation state of an internal combustion engine. The electronic control throttle system subjects a throttle opening to feedback control using a motor-driven throttle actuator or the like such that an actual throttle opening coincides with the target opening.

In this case, for the purpose of improvement of fail safety, the throttle position sensor and an accelerator position sensor are constituted by multiple systems. The multiple system sensors carry out throttle opening control, abnormality monitoring, and the like at the time of normal operation while comparing plural sensor output signals.

As a prior art document concerning detection of an abnormality of a throttle position sensor, for example, there is JP-A-2001-303976.

JP-A-2001-303976 describes as follows. In a throttle control apparatus for an internal combustion engine disclosed in JP-A-2001-303976, "even if a throttle opening signal from the throttle position sensor is judged as abnormal because of instantaneous contact failure, external noise, or the like, a state in which energization to an electric motor is allowed is maintained until the abnormal state lasts exceeding a first predetermined time. Thus, even if the throttle position sensor falls into an instantaneous abnormal state, an operation state of an internal combustion engine is not affected. Therefore, drivability is not spoiled."

"When the abnormal state of the throttle position sensor is detected continuously for the first predetermined time or more, energization to the electric motor is stopped once and a throttle is kept at a predetermined mechanical opening. Thus, it is possible to prevent a careless increase in the number of revolutions of the internal combustion engine or an engine trouble. When the abnormal state of the throttle position sensor is solved before a second predetermined time longer than the first predetermined time elapses, the throttle control apparatus can return to normal throttle control by resuming energization to the electric motor."

However, in JP-A-2001-303976, when a deviation between two throttle opening signals in the multiple system constitution and a deviation between two accelerator opening signals in the multiple system constitution deviate from predetermined values set in advance, respectively, and this state continues for the first predetermined time or more, an abnormality of the throttle position sensor and the accelerator position sensor is detected, energization to the electric motor is temporarily stopped, the throttle is kept at a predetermined mechanical opening, and energization to the electric motor is resumed when the abnormal state is solved before the second predetermined time elapses.

Therefore, in an abnormal state in which sensor output signals fluctuate repeatedly because of contact failure or the like of the sensors, abnormality detection cannot be performed when the fluctuation in the sensor output signals is shorter than the first predetermined time. When the fluctuation is longer than the first predetermined time and shorter than the second predetermined time, since the stop of energization to the electric motor and the resumption of energization are performed repeatedly, an operation state of the internal combustion engine is affected to deteriorate drivability. In the worst case, for example, a careless increase in the number of revolution of the internal combustion engine and an engine trouble occur.

Since an abnormality is detected by comparing a deviation between two sensor output signals and a predetermined abnormality judgment value set in advance, it is necessary to set the abnormality judgment value taking into account all operation states. Thus, the abnormality judgment value has to be a large set value having an allowance.

In order to prevent misjudgment for transient noise, a judgment time has to be a large set value having an allowance.

Moreover, when the two sensors use a power supply and a ground in common, it is difficult to perform abnormality detection of the sensors concerning abnormalities such as fluctuation in two sensor output signals in the same phase due to contact failure in a power supply terminal and a ground terminal serving as common terminals and repeated fluctuation in a sensor output value due to contact failure of the sensors. Thus, a detection ability for a sensor abnormality falls.

SUMMARY OF THE INVENTION

The invention has been devised to solve the problems and it is an object of the invention to provide a sensor abnormality detecting method that can surely perform abnormality detection for an abnormality such as repeated fluctuation in a sensor output signal at the time of an abnormality of a sensor.

It is another object of the invention to provide an electronic throttle control apparatus that can surely perform abnormality detection for an abnormality such as repeated fluctuation in a sensor output signal at the time of a sensor abnormality due to contact failure or the like of a throttle position sensor and can prevent a careless increase in the number of revolution of an internal combustion engine and an engine trouble and secure traveling safety of a vehicle.

A sensor abnormality detecting method according to the invention is a sensor abnormality detecting method that is applied to a control system that detects a control amount of a control object with a sensor, generates an operation amount such that the control amount coincides with a target value that is set according to a control operation state, and outputs the operation amount generated to an actuator to perform feedback control. The sensor abnormality detecting method includes: calculating a sum of a change in a control deviation obtained from the target value and the control amount per a predetermined time; and detecting an abnormality of the sensor according to comparison of the sum of the change in the control deviation and a predetermined values set in advance.

Therefore, according to the sensor abnormality detecting method of the invention, it is possible to surely perform abnormality detection for an abnormality such as repeated fluctuation in a sensor output signal at the time of sensor abnormality.

An electronic throttle control apparatus according to the invention includes: a throttle valve that adjusts an amount of supply air to an internal combustion engine; a throttle position sensor that detects an opening of the throttle valve; a throttle actuator that drives the throttle valve; an accelerator position sensor that detects an operation amount of an accelerator pedal; a target throttle opening value calculating unit that calculates a target throttle opening value on the basis of an accelerator opening amount detected by the accelerator position sensor; a throttle control unit that generates an operation amount such that the target throttle opening value and the opening of the throttle valve detected by the throttle position sensor coincide with each other and outputs the operation amount to the throttle actuator to perform feedback control; and a sensor abnormality detecting unit that calculates, in an operation state in which a change in the target throttle opening value is equal to or smaller than a predetermined value, a sum of a change in a control deviation obtained from the target throttle opening value and the throttle position sensor detection value per a predetermined time and detects an abnormality of the throttle position sensor according to comparison of the sum of the change in the control deviation and a predetermined value set in advance.

According to the electronic throttle control apparatus of the invention, it is possible to surely perform abnormality detection for an abnormality such as repeated fluctuation in a sensor output signal at the time of a sensor abnormality due to contact failure of the throttle position sensor. Thus, it is possible to prevent a careless increase in the number of revolutions of an internal combustion engine and an engine trouble and secure traveling safety of a vehicle.

The throttle position sensor of the electronic throttle control apparatus according to the invention is constituted by a multiple system including a first throttle position sensor and a second throttle position sensor. The throttle control unit calculates, in an operation state in which the change in the target throttle opening value is equal to or smaller than the predetermined value, a sum of a change in a control deviation obtained from the target throttle opening value and the detection value of the first throttle position sensor per a predetermined time and judges, when the sum of the change in the control deviation per the predetermined time is equal to or larger than the predetermined value set in advance, that the first throttle position sensor is abnormal, limits the target throttle opening value according to the predetermined value, switches a control amount of the throttle actuator to a detection value of the second throttle position sensor, and generates an operation amount such that the detection value of the second throttle position sensor coincides with the target throttle opening value and outputs the operation amount to the throttle actuator to perform feedback control.

Therefore, according to the electronic throttle control apparatus of the invention, it is possible to surely perform abnormality detection for the first throttle position sensor. Since the target throttle opening value is limited according to the predetermined value at the time of abnormality detection and throttle opening control is performed on the basis of an output value of the normal second throttle position sensor, it is possible to prevent a careless increase in the number of revolutions of the internal combustion engine and an engine trouble and secure traveling safety of the vehicle.

The foregoing and other objects, features, aspects and advantages of the present invention will become more apparent from the following detailed description of the invention when taken in conjunction with the accompanying drawings.

DETAILED DESCRIPTION OF THE INVENTION

Figure 1:
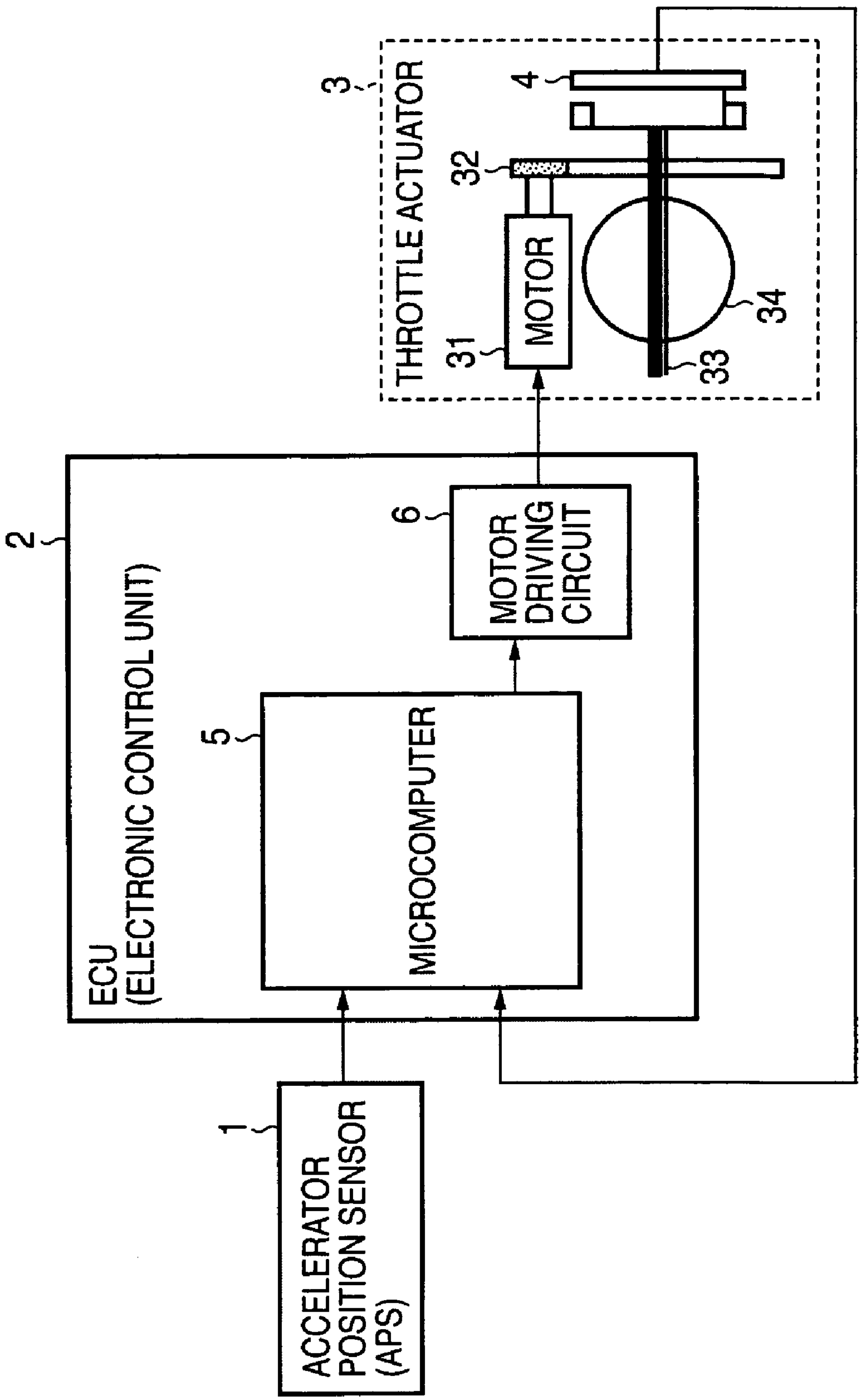
FIG. 1 is a diagram showing a schematic constitution of an electronic throttle control apparatus according to a first embodiment of the invention.

Embodiments of the invention will be hereinafter explained with reference to the accompanying drawings.

Note that, in the drawings, identical reference numerals and signs denote identical or equivalent components.

First Embodiment

FIG. 1 is a diagram showing a schematic constitution of an electronic throttle control apparatus according to a first embodiment of the invention.

In FIG. 1, reference numeral 1 denotes an accelerator position sensor (APS) that detects a position of a not-shown accelerator pedal as an accelerator opening and 2 denotes an electronic control unit (ECU) that performs various kinds of internal combustion engine control. The ECU 2 includes a throttle control unit that performs supply air amount control for a not-shown internal combustion engine. The ECU 2 includes at least a microcomputer 5 and a motor driving circuit 6.

Reference numeral 3 denotes a throttle actuator. In the throttle actuator 3, a driving force of a motor 31 is transmitted to a throttle shaft 33 via a deceleration gear 32 in a decelerator to drive a throttle valve 34.

Reference numeral 4 denotes a throttle position sensor (TPS) of a potentiometer type that detects a throttle valve position as a throttle opening.

An accelerator opening signal from the accelerator position sensor (APS) 1 and at least a rotation speed signal of the not-shown internal combustion engine are inputted to a microcomputer 5 of the ECU 2. The microcomputer 5 calculates a target throttle opening value of a throttle valve 34 of the throttle actuator 3. In addition, the microcomputer 5 generates an operation amount (e.g., a DUTY signal at the time of PWM driving) according to feedback (F/B) control (e.g., PID control) arithmetic operation on the basis of a control deviation obtained from a target throttle opening value and an actual throttle opening value such that an actual throttle opening value signal inputted from the throttle position sensor (TPS) 4 coincides with the target throttle opening value, outputs the operation amount to the motor driving circuit 6, and feeds a desired current to the motor 31 to drive the throttle valve 34.

Figure 2:
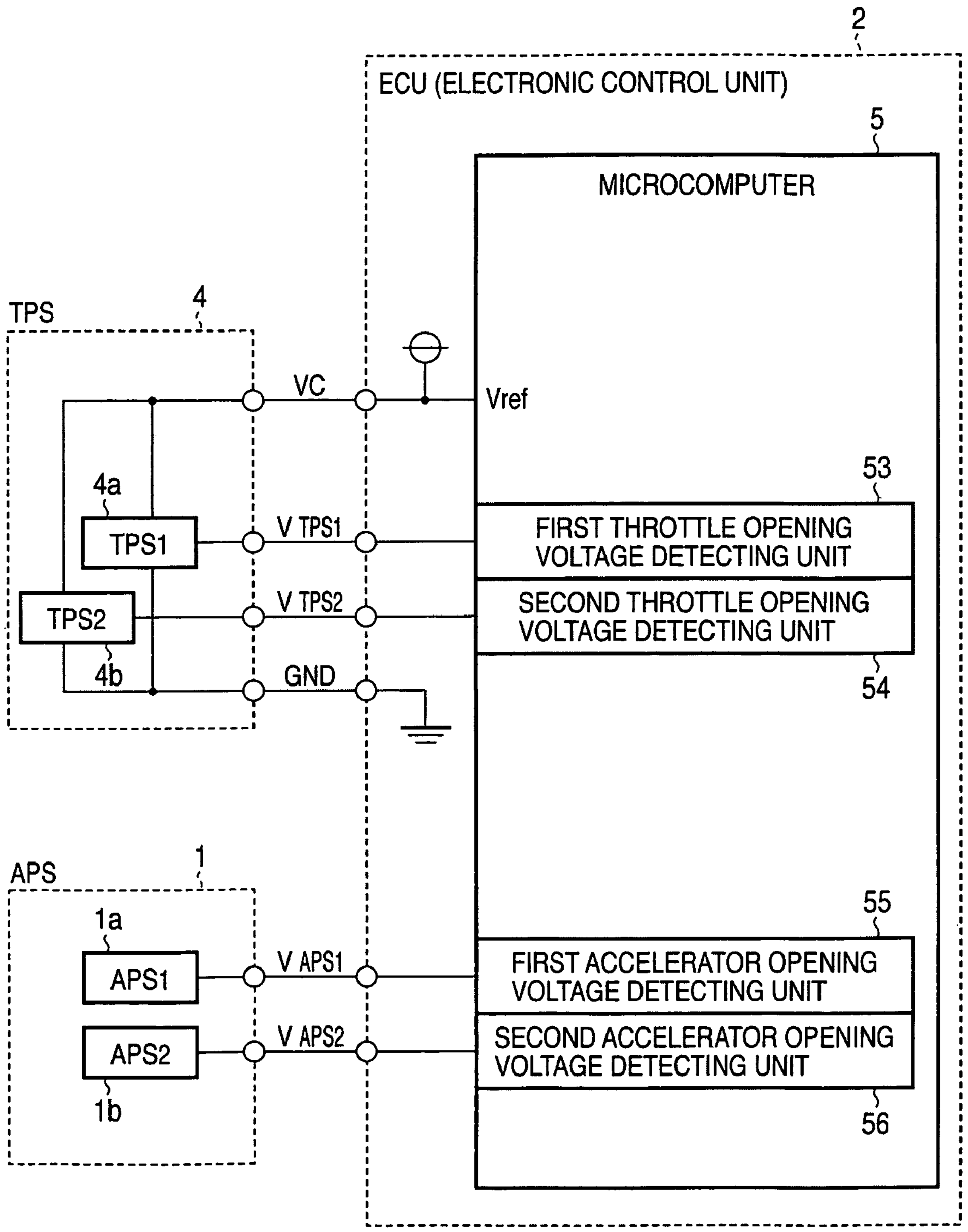
FIG. 2 is a diagram showing a schematic constitution of an input I/F circuit for a throttle position sensor and an accelerator position sensor.

FIG. 2 shows a schematic constitution of an input I/F circuit for the throttle position sensor (TPS) 4 and the accelerator position sensor (APS) 1. In the ECU 2, a constant voltage (e.g., 5V) generated by a not-shown constant voltage circuit with a battery voltage as an input is supplied to the throttle position sensor (TPS) 4 and the accelerator position sensor (APS) 1 as a sensor supply voltage VC. The sensor supply voltage VC is also inputted to the microcomputer 5 as a reference voltage Vref of a not-shown AD converter.

Note that, in FIG. 2, two accelerator position sensors, a first accelerator position sensor (APS1) 1*a* and a second accelerator position sensor (APS2) 1*b*, are provided in the accelerator position sensor 1 and two throttle position sensors, a first throttle position sensor (TPS1) 4*a* and a second throttle position sensor (TPS2) 4*b*, are provided in the throttle position sensor 4.

In FIG. 2, reference sign VAPS1 denotes a first accelerator opening voltage signal outputted from the first accelerator position sensor (APS1); VAPS2, a second accelerator opening voltage signal outputted from the second accelerator position sensor (APS2) 1*b*; VTPS1, a first throttle opening voltage outputted from the first throttle position sensor (TPS1) 4*a*; and VTPS2, a second throttle opening voltage outputted from the second throttle position sensor (TPS2) 4*b*.

Reference numeral 53 denotes a first throttle opening voltage detecting unit; 54, a second throttle opening voltage detecting unit; 55, a first accelerator opening voltage detecting unit; and 56, a second accelerator opening voltage detecting unit. The throttle opening voltage detecting units and the accelerator opening voltage detecting units are provided in the microcomputer 5.

Figure 3:
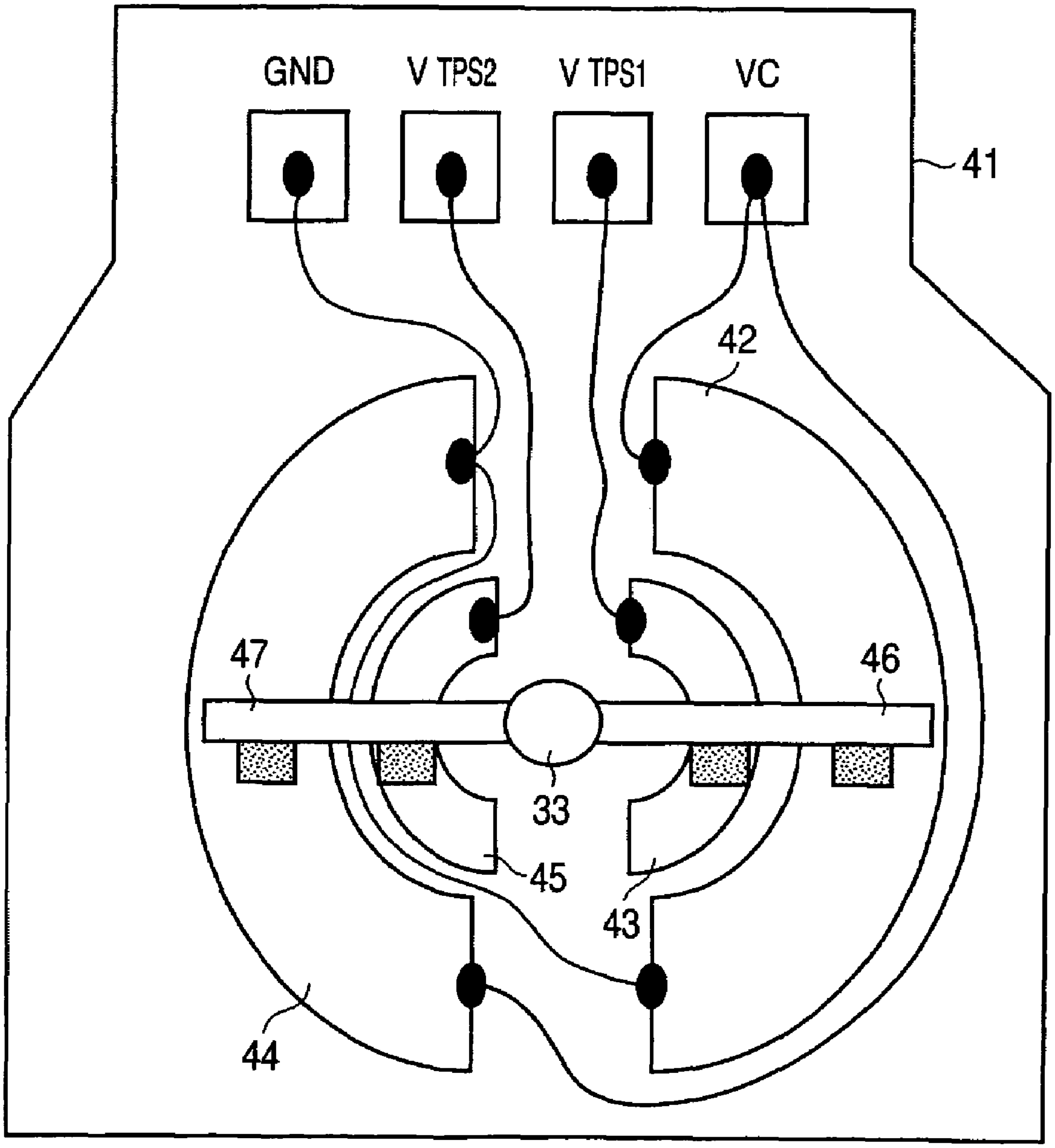
FIG. 3 is a diagram showing a constitution of the throttle position sensor.

FIG. 3 is a diagram showing a constitution of the throttle position sensor (TPS) 4.

As shown in the figure, a position detecting unit including a sliding resistor 42 and a conductor 43 and a position detecting unit including a sliding resistor 44 and a conductor 45 are formed on a substrate 41 of the throttle position sensor 4. The respective sliding resistors and the respective conductors are formed in an arc shape.

The sliding resistors 42 and 44 constitute a resistance circuit surface. Both ends of the respective sliding resistors are connected to a VC terminal on a sensor power supply side and a GND terminal on a ground side by conductors.

A sensor power supply voltage VC is supplied to the two sliding resistors 42 and 44 in the throttle position sensor 4. In accordance with rotational movement of the throttle valve 34, output voltages VTPS1 (a first throttle opening voltage) and VTPS2 (a second throttle opening voltage), which are extracted as sliders 46 and 47 coupled to the throttle shaft 33 slide on a resistance surface of the sliding resistor, are inputted to the first throttle opening voltage detecting unit 53 and the second throttle opening voltage detecting unit 54 via a not-shown AD converter in the microcomputer 5.

The accelerator position sensor (APS) 1 is also constituted by a potentiometer of a contact type like the throttle position sensor (TPS) 4. The accelerator position sensor (APS) 1 outputs a first accelerator opening voltage signal VAPS1 and a second accelerator opening voltage signal VAPS2 proportional to an accelerator pedal operation amount. The first accelerator opening voltage signal VAPS1 is inputted to the first accelerator opening voltage detecting unit 55 and the second accelerator opening voltage signal VAPS2 is inputted to the second accelerator opening voltage detecting unit 56 via the not-shown AD converter in the microcomputer 5.

The sliders 46 and 47 have contact sections in two places that slide against the respective sliding resistors and the respective conductors. The sliders 46 and 47 rotationally move together with the throttle shaft 33.

As the sliders 46 and 47 rotationally move together with the throttle shaft 33, sliding positions of the sliding sections of the sliding resistors 42 and 44 and the sliders 46 and 47 change. Thus, the output voltages VTPS1 and VPTS2 extracted from the sliders 46 and 47, respectively, change and are inputted to the ECU 2 as a throttle opening voltage signal.

Figure 4:
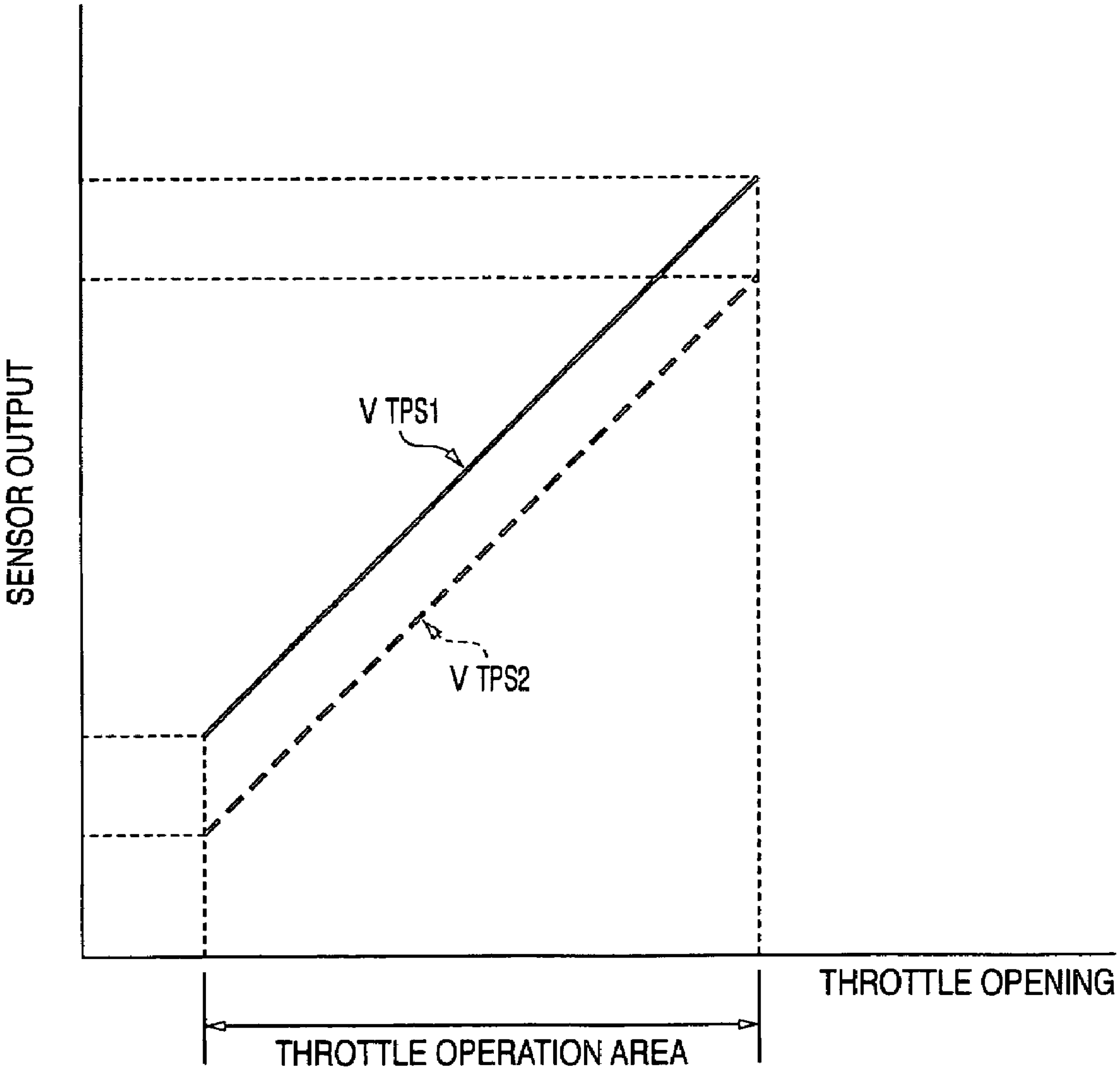
FIG. 4 is a graph showing an output characteristic A of the throttle position sensor.

FIG. 4 shows an output characteristic A of the throttle position sensor (TPS) 4. As the output characteristic A, a voltage value proportional to a throttle opening is outputted as the output voltage VTPS1 of the first throttle position sensor (TPS1) 4*a* and a voltage value that is offset by a predetermined value to a throttle fully-closed side with respect to the output voltage VTPS1 of the first throttle position sensor 4*a* and proportional to a throttle opening is outputted as the output voltage VTPS2 of the second throttle position sensor (TPS2) 4*b*.

Figure 5:
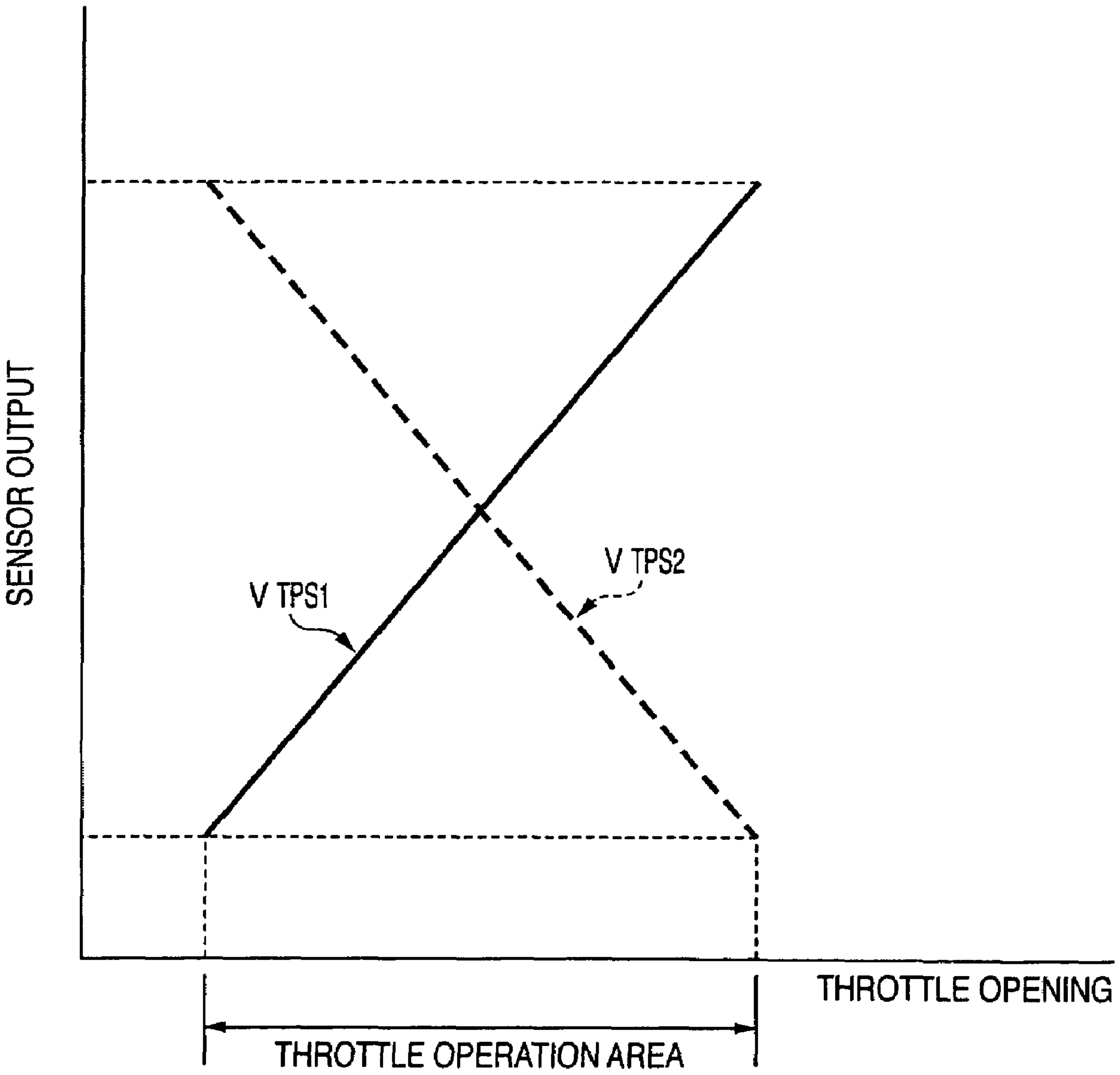
FIG. 5 is a graph showing an output characteristic B of the throttle position sensor.

FIG. 5 shows an output characteristic B of the throttle position sensor (TPS) 4. As the output characteristic B, a voltage value proportional to a throttle opening is outputted as the output voltage VTPS1 of the first throttle position sensor (TPS1) 4*a* and a voltage value inversely proportional to a throttle opening is outputted as the output voltage VTPS2 of the second throttle position sensor (TPS2) 4*b*.

Figure 6:
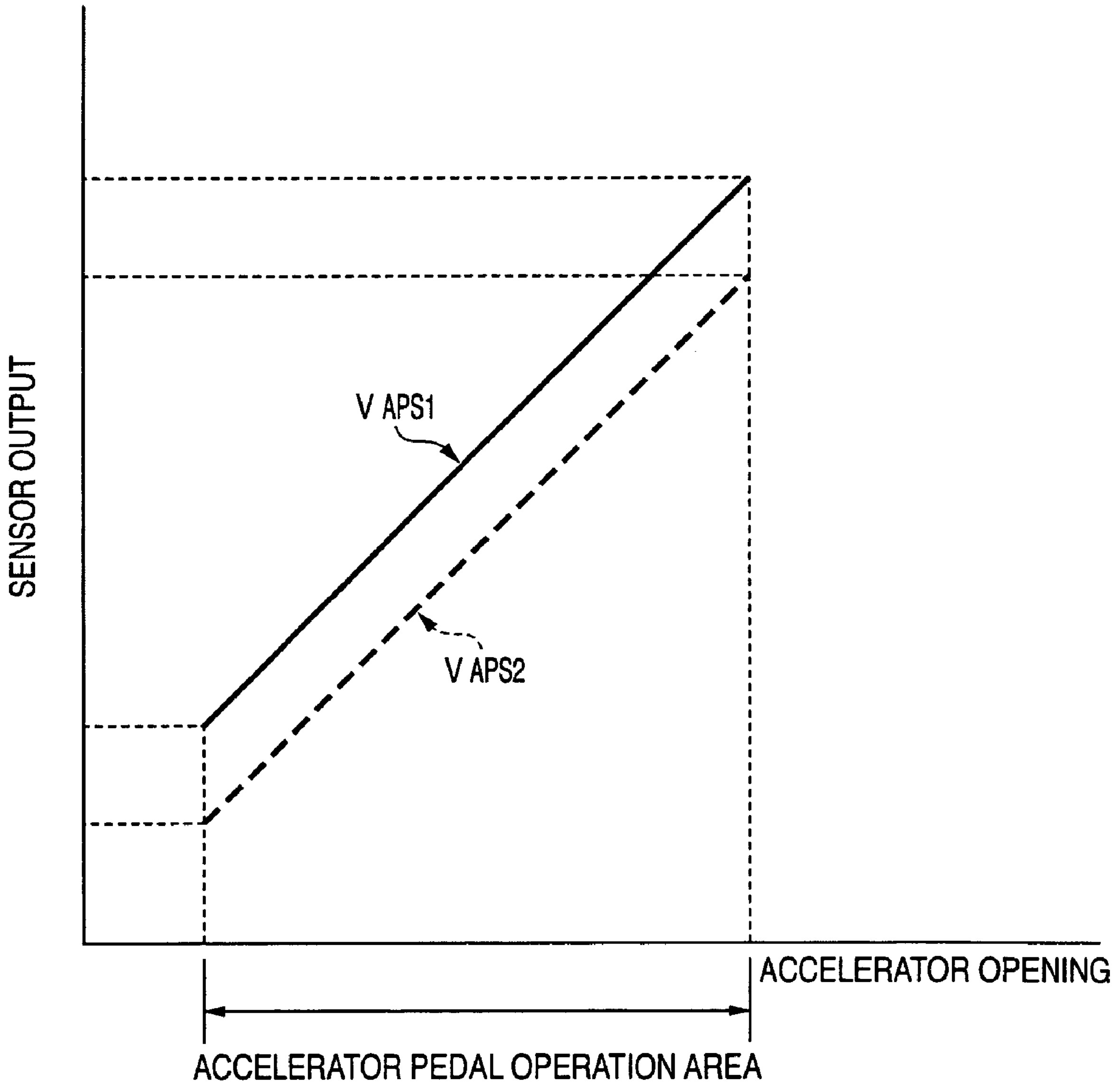
FIG. 6 is a graph showing an output characteristic of the accelerator-position sensor.

FIG. 6 shows an output characteristic of the accelerator position sensor (APS) 1. As the output characteristic, a voltage value proportional to an accelerator opening is outputted as the output voltage VAPS1 of the first accelerator position sensor (APS1) 1*a* and a voltage value that is offset to a minus side with respect to the output voltage VAPS1 of the first accelerator position sensor (APS1) 1*a* and proportional to an accelerator opening is outputted as the output voltage VAPS2 of the second accelerator position sensor (APS2) 1*b*.

Figure 7:
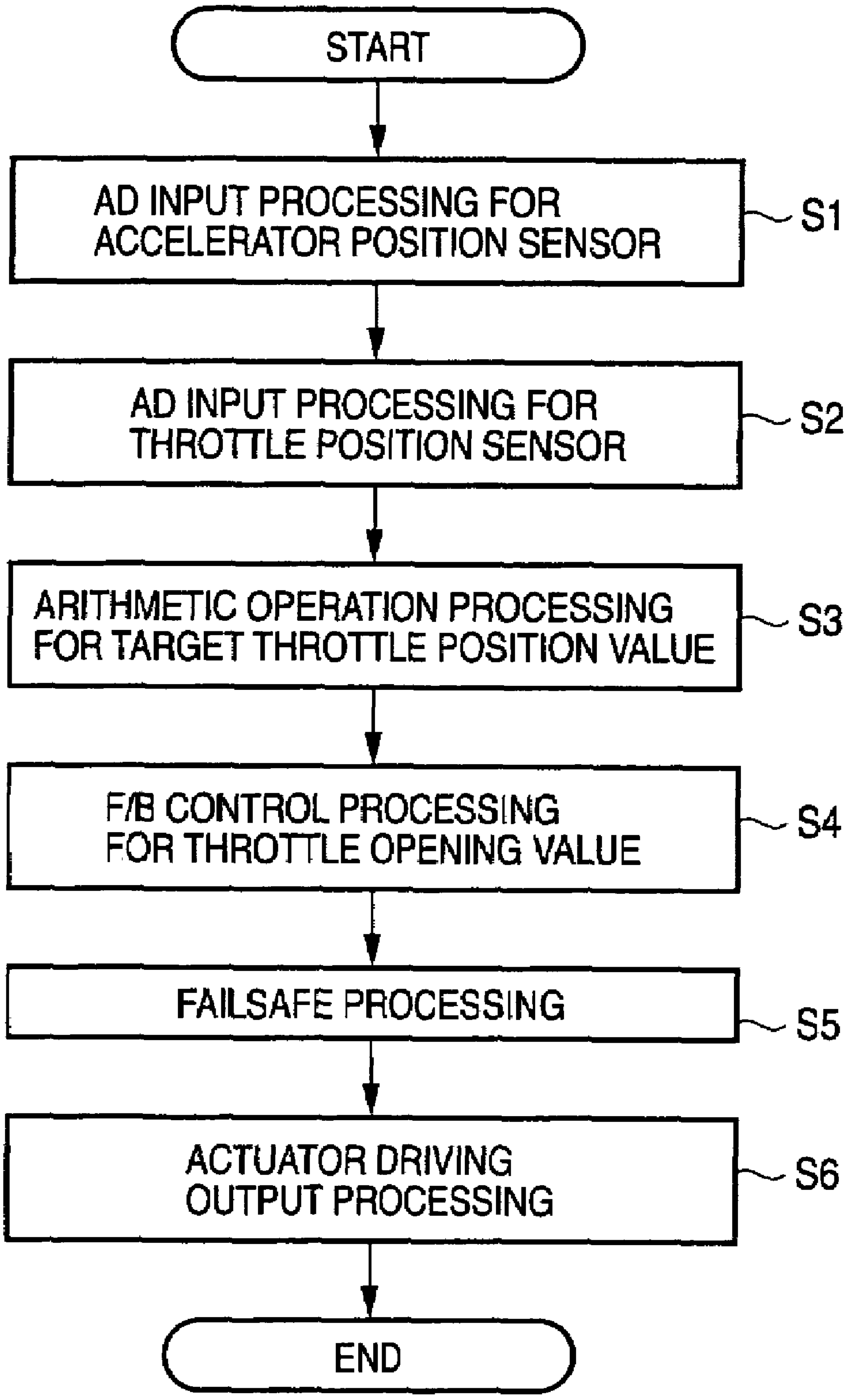
FIG. 7 is a flowchart for schematically explaining throttle opening control in an ECU.

FIG. 7 is a flowchart for schematically explaining throttle opening control in the ECU 2.

In order to electrically detect an accelerator pedal operation amount of a driver in two systems, the electronic throttle control apparatus inputs the first accelerator opening voltage VAPS1 and the second accelerator opening voltage VAPS2, which are output voltages of the accelerator position sensor 1, to the not-shown AD converter of the microcomputer 5 and detects AD conversion values of the respective accelerator opening voltages as accelerator opening signals with the first accelerator opening voltage detecting unit 55 and the second accelerator opening voltage detecting unit 56 (step S1).

In order to electrically detect an opening position of the throttle valve 34 of the throttle actuator 3 in two systems, the electronic throttle control apparatus inputs the first throttle opening voltage VTRS1 and the second throttle opening voltage VTPS2, which are output voltages of the throttle position sensor 4, to the not-shown AD converter of the microcomputer 5 and detects AD conversion values of the respective throttle opening voltages as throttle opening signals with the first throttle opening voltage detecting unit 53 and the second throttle opening voltage detecting unit 54 (step S2).

The electronic throttle control apparatus calculates a target throttle opening voltage VTAG of the throttle valve 34 of the throttle actuator 3 for adjusting an amount of supply air to the engine on the basis of an accelerator opening signal, a not-shown engine rotation speed signal, and the like (step S3).

The electronic throttle control apparatus calculates, using a not-shown throttle control unit, an operation amount (a control DUTY signal for PWM drive) according to, for example, PID (proportional, integral, differential) control arithmetic operation on the basis of a control deviation obtained from the target throttle opening voltage VTAG and an actual throttle opening voltage VTPS1 (=VTAG−VTPS1) such that the target throttle opening voltage VTAG coincides with the actual throttle opening voltage VTPS1 (step S4).

The electronic throttle control apparatus performs abnormality monitoring for the accelerator position sensor 1, the throttle position sensor 4, and the throttle actuator 3 on the basis of an accelerator opening signal, a throttle opening signal, and a value of an energization current to the motor 31 of the throttle actuator 3 and, when an abnormality is detected, performs failsafe processing such as engine output limitation and throttle opening limitation (step S5).

If it is judged in the failsafe processing in step S5 that an abnormality has not occurred, the electronic throttle control apparatus outputs the PWM drive signal, which is the operation amount calculated in the throttle opening F/B control arithmetic processing in step S4, to the motor driving circuit 6.

On the other hand, when it is judged in the failsafe processing in step S5 that an abnormality has occurred, the electronic throttle control apparatus outputs a PWM drive signal (a control DUTY value=0) for stopping energization to the motor 31 (step S6).

Figure 8:
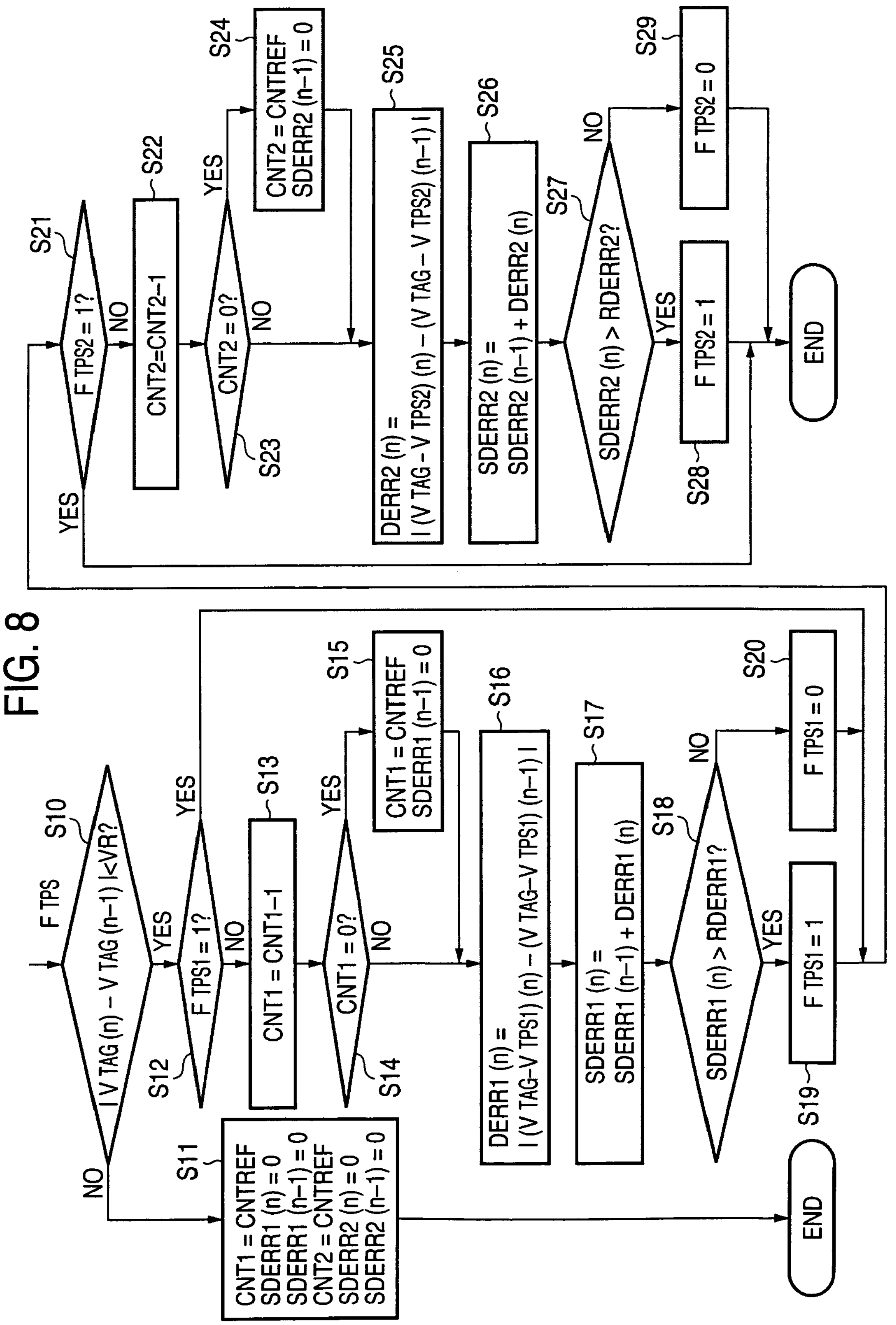
FIG. 8 is a flowchart showing characteristic abnormality detection processing procedures in the case in which the throttle position sensor with the output characteristic A is used.

FIG. 8 shows a TPS characteristic abnormality (excluding open/short failure of a sensor signal) detection processing flow in the case in which a signal of the throttle position sensor with the TPS output characteristic A shown in FIG. 4 is used as a throttle opening signal in two system outputs.

First, the electronic throttle control apparatus judges whether a change in the target throttle opening value VTAG (|VTAG(n)−VTAG(n−1)|) is equal to or smaller than a predetermined value VR as a condition for carrying out TPS characteristic abnormality detection processing (step S10).

"n" indicates present control period timing in a throttle opening control period (e.g., 5 ms).

When the change in the target throttle opening value (|VTAG(n)−VTAG(n−1)|) is equal to or larger than the predetermined value VR, a throttle operation is in a transient state and the TPS characteristic abnormality detection condition is not satisfied. Thus, the electronic throttle control apparatus initializes a timer counter value measuring time for calculating a sum of a change in a control deviation calculated from the target throttle opening value VTAG and the actual throttle opening value VTPS1 (CNT1=CNT2=CNTREF), clears a sum of a change in an opening voltage deviation between TPS1 and TPS2 {SDERR1(*n*), SDERR1(*n*−1)} and {SDERR2(*n*), SDERR2(*n*−1)}, and ends the processing (step S11).

When the change in the target throttle opening value (|VTAG(n)−VTAG(n−1)|) is equal to or smaller than the predetermined value VR, the electronic throttle control apparatus performs TPS characteristic abnormality detection processing.

The electronic throttle control apparatus judges according to a TPS1 characteristic abnormality judgment flag FTPS1 whether characteristic abnormality detection processing for the first throttle position sensor (TPS1) 4*a* is performed (step S12).

When the TPS1 characteristic abnormality judgment flag is set (FTPS1=1), since the first throttle position sensor (TPS1) 4*a* has already been subjected to characteristic abnormality judgment, the electronic throttle control apparatus shifts to characteristic abnormality judgment processing for the second throttle position sensor (TPS2) 4*b* (i.e., shifts to step S21).

When the TPS1 characteristic abnormality judgment flag is reset (FTPS1=0), the electronic throttle control apparatus decrements a timer counter CNT1 measuring time for calculating a sum of a change in a control deviation calculated from the target throttle opening value VTAG and the actual throttle opening value VTPS1 (step S13). The electronic throttle control apparatus judges whether the time for calculating the sum of the change in the control deviation calculated from the target throttle opening value VTAG and the actual throttle opening value VTPS1 has reached a predetermined time (CNTREF: e.g., 200 ms) (step S14). When the predetermined time has elapsed, the electronic throttle control apparatus sets the timer counter CNT1 to the predetermined value CNTREF and clears a sum SDERR1(*n*−1) of a change in a control deviation calculated until the last control period (step S15).

The electronic throttle control apparatus calculates a change DERR1(*n*) of a control deviation calculated from the target throttle opening value VTAG and the actual throttle opening value VTPS1 in the present control period according to an absolute value of a difference between a present control deviation (VTAG−VTPS1)(*n*) and a last control deviation (VTAG−VTPS1)(*n*−1) (step S16). The electronic throttle control apparatus adds the present control deviation to the sum SDERR1(*n*−1) of the change in the control deviation calculated until the last control period to calculate a sum SDERR1(*n*) of a change in a control deviation calculated until the present control period (step S17). The electronic throttle control apparatus compares the sum SDERR1(*n*) of the change in the control deviation with the predetermined value RDERR1 for TPS1 characteristic abnormality judgment (step S18). When the sum SDERR1(*n*) is equal to or larger than the predetermined value RDERR1, the electronic throttle control apparatus sets a characteristic abnormality flag of TPS1 (FTPS1=1) (step S19). When the sum SDERR1(*n*) is equal to or smaller than the predetermined value RDERR1, the electronic throttle control apparatus resets the characteristic abnormality flag (FTPS1=0) (step S20).

The electronic throttle control apparatus performs characteristic abnormality detection processing for the second throttle position sensor (TPS2) 4*b* according to a processing method same as that for the first throttle position sensor (TPS1) 4*a*.

The electronic throttle control apparatus judges according to a TPS2 characteristic abnormality judgment flag FTPS2 whether the characteristic abnormality detection processing for the second throttle position sensor (TPS2) 4*b* is performed (step S21).

When the TPS2 characteristic abnormality judgment flag is set (FTPS2=1), since the second throttle position sensor (TPS2) 4*b* has already been subjected to characteristic abnormality judgment, the electronic throttle control apparatus does not perform abnormality detection processing.

When the TPS2 characteristic abnormality judgment flag is reset (FTPS2=0), the electronic throttle control apparatus decrements a timer counter CNT2 measuring time for calculating a sum of a change in a deviation calculated from the target throttle opening value VTAG and the actual throttle opening value VTPS2 (step S22). The electronic throttle control apparatus judges whether a sum calculation time for a change in a control deviation calculated from the target throttle opening value VTAG and the actual throttle opening value VTPS2 has reached the predetermined time (CNTREF) (step S23). When the predetermined time has elapsed, the electronic throttle control apparatus sets the timer counter CNT2 to the predetermined value CNTREF and clears a sum SDERR2($n$−1) of a change in a control deviation calculated until the last control period (step S24).

The electronic throttle control apparatus calculates a change DERR2($n$) in a control deviation calculated from the target throttle opening value VTAG and the actual throttle opening value VTPS2 in the present control period according to an absolute value of a difference between a present control deviation (VTAG−VTPS2)($n$) and a last control deviation (VTAG−VTPS2)($n$−1) (step S25). The electronic throttle control apparatus adds the present control deviation to the sum SDERR2($n$−1) of the change in the control deviation calculated until the last control period to calculate a sum SDERR2($n$) of a change in a control deviation calculated until the present control period (step S26). The electronic throttle control apparatus compares the sum SDERR2($n$) of the change in the control deviation with the predetermined value RDERR2 for TPS2 characteristic abnormality judgment (step S27) When the sum SDERR2($n$) is equal to or larger than the predetermined value RDERR2, the electronic throttle control apparatus sets a characteristic abnormality flag of TPS2 (FTPS2=1) (step S28). When the sum SDERR2($n$) is equal to or smaller than the predetermined value RDERR2, the electronic throttle control apparatus resets the characteristic abnormality flag (FTPS1=0) (step S29) and ends the processing.

Figure 9:
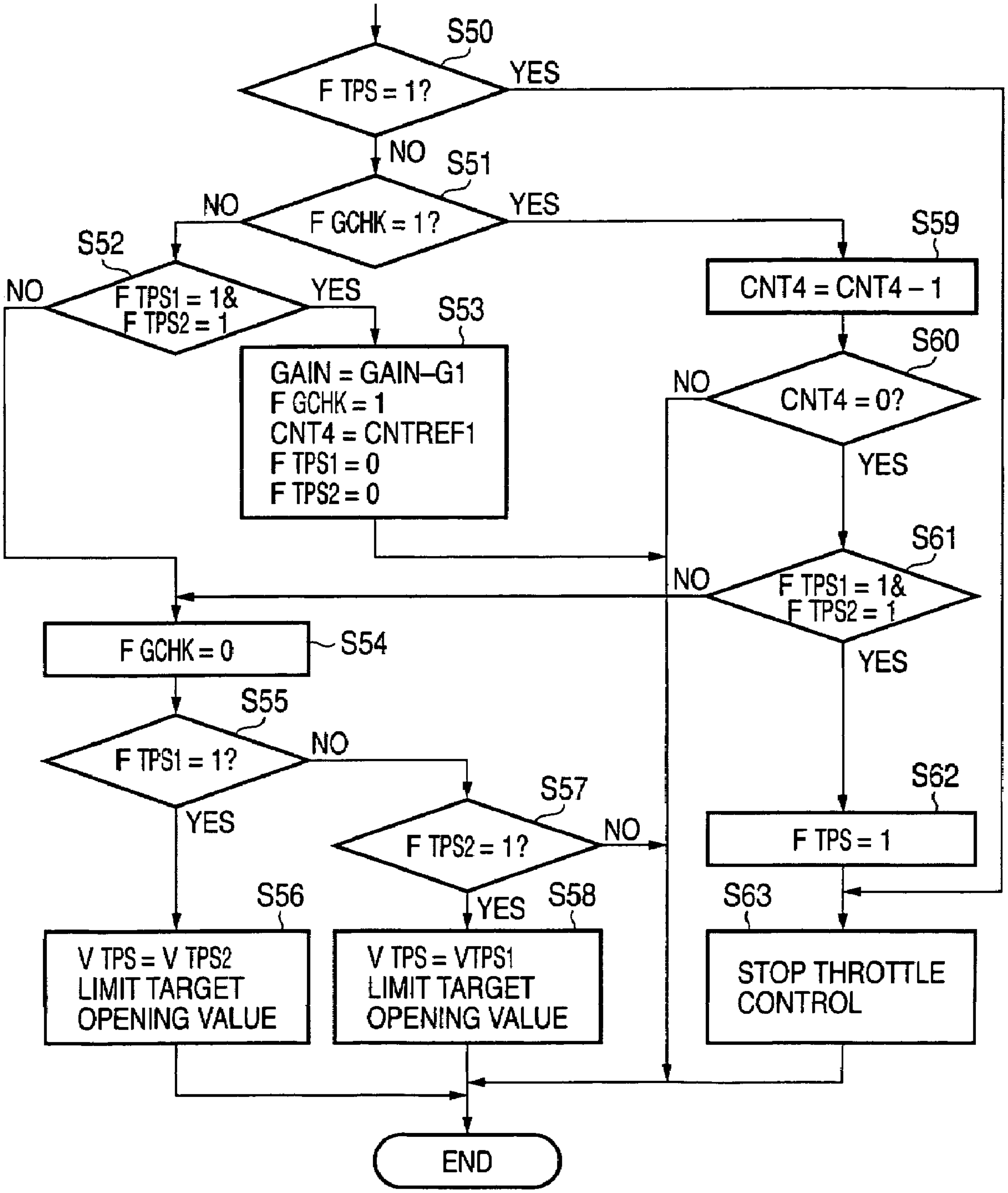
FIG. 9 is a flowchart showing failsafe processing procedures at the time of a characteristic abnormality of the throttle position sensor.

Failsafe processing at the time of a TPS characteristic abnormality of the throttle position sensor 4 is explained with reference to FIG. 9.

In the method of detecting a TPS characteristic abnormality based on fluctuation in a TPS output signal, it is possible that a TPS itself is abnormal and an output signal fluctuates and that a TPS itself is normal, a characteristic (e.g., a motor torque characteristic) of the throttle actuator 3 deteriorates over time unexpectedly, and an output signal fluctuates because of occurrence of control hunting due to inconsistency of the characteristic with a predetermined control gain set by the throttle control unit.

In this embodiment, when both the characteristic abnormality flag (FTPS1) of the first throttle position sensor (TPS1) 4$a$ and the characteristic abnormality flag (FTPS2) of the second throttle position sensor (TPS2) 4$b$ are set, it is possible to check whether both the throttle position sensors have become abnormal simultaneously (multiple failure) or output signals of both the throttle position sensors fluctuate because of occurrence of control hunting and the characteristic abnormality flag has been set.

First, in step S50, the electronic throttle control apparatus judges whether multiple failure of a TPS characteristic abnormality of the first throttle position sensor (TPS1) 4$a$ and the second throttle position sensor (TPS2) 4$b$ has occurred. When it is judged that characteristic abnormalities occur in both the throttle position sensors (FTPS=1), the electronic throttle control apparatus stops throttle control (stops energization to the motor) and keeps the throttle at a predetermined mechanical opening to perform retreat traveling (step S63).

When it is not judged that characteristic abnormalities occur in both the throttle position sensors (i.e., the first throttle position sensor 4$a$ and the second throttle position sensor 4$b$) of the throttle position sensor 4 (FTPS=0), the electronic throttle control apparatus judges according to a control hunting check flag (FGCHK) whether characteristic abnormality flags for both the throttle position sensors are set and the flags are set because of the control hunting (step S51).

When the control hunting check flag is cleared (FGCHK=0), in step S52, the electronic throttle control apparatus judges whether both the characteristic abnormality flag (FTPS1) of the first throttle position sensor (TPS1) 4$a$ and the characteristic abnormality flag (FTPS2) of the second throttle position sensor (TPS2) 4$b$ are set.

When both the flags are set (FTPS1=1, FTPS2=1), in step S53, as initial setting for the control hunting check processing, the electronic throttle control apparatus sets a predetermined control gain (GAIN: e.g., proportional gain) smaller by a predetermined value (G1) (GAIN=GAIN−G1), sets the control hunting check flag (FGCHK=1), and sets a timer counter for control hunting check time to an initial value (CNT4=CNTREF1) (in order to check again according to the TPS characteristic abnormality processing whether control hunting is controlled by setting the predetermined control gain small, sets the timer counter to a set value larger than the initial value of the TPS characteristic abnormality judgment counter CNTREF1>CNTREF).

Moreover, in order to check whether control hunting is controlled by setting the predetermined control gain (GAIN) small and both the TPS characteristic abnormality flags are not set again according to the TPS characteristic abnormality detection processing again, the electronic throttle control apparatus clears both the TPS characteristic abnormality flags (FTPS1=0, FTPS2=0) and ends the processing.

When both the TPS characteristic abnormality flags are not set in step S52, in step S54, the electronic throttle control apparatus clears the control hunting check flag (FGCHK=0). If the characteristic abnormality flag (FTPS1) of the first throttle position sensor (TPS1) 4$a$ is set (FTPS1=1) in step S55, a characteristic of the first throttle position sensor (TPS1) 4$a$ is abnormal. The electronic throttle control apparatus switches the throttle opening signal to an output signal of the second throttle position sensor (TPS2) 4$b$ (VTPS=VTPS2) and sets an upper limit of the target throttle opening value (VTAG) according to a predetermined value (VLIM) (step S56) to end the processing.

When the characteristic abnormality flag (FTPS1) of the first throttle position sensor (TPS1) 4$a$ is cleared (FTPS1=0) in step S55, the electronic throttle control apparatus judges whether the characteristic abnormality flag (FTPS2) of the second throttle position sensor (TPS2) 4$b$ is set (step S57). When the flag is cleared (FTPS2=0), since both the throttle position sensors are normal, the electronic throttle control apparatus directly ends the processing. When the flag is set (FTPS2=1), a characteristic of the second throttle position sensor (TPS2) 4$b$ is abnormal. The electronic throttle control apparatus uses the output signal of the first throttle position sensor (TPS1) 4$a$ as the throttle opening signal (VTPS=VTPS1) and sets an upper limit of the target throttle opening value (VTAG) according to the predetermined value (VLMT) (step S58) to end the processing.

When the control hunting check flag is set (FGCHK=1) in step S51, in step S59, the electronic throttle control apparatus decrements the timer counter for control hunting check time (CNT4) (CNT4=CNT4−1) and judges whether the control hunting check time has reached the predetermined time using the timer counter (CNT4=0) (step S60).

When the predetermined time has not elapsed (CNT4≠0), the electronic throttle control apparatus directly ends the processing. When the predetermined time has elapsed (CNT4=0), in step S61, the electronic throttle control apparatus judges whether both the TPS characteristic abnormality flags are set. When both the TPS characteristic abnormality flags are set (FTPS1=1, FTPS2=1), the electronic throttle control apparatus judges that characteristic abnormalities of the first throttle position sensor (TPS1) 4*a* and the second throttle position sensor (TPS2) 4*b* occur simultaneously and sets a multiple failure flag (FTPS=1) (step S62). The electronic throttle control apparatus stops throttle control (stops energization to the motor) and keeps the throttle at the predetermined mechanical opening to perform retreat traveling (step S63).

When both the TPS characteristic abnormality flags are not set in step S61, the electronic throttle control apparatus judges that, since the predetermined control gain (GAIN) is set smaller by a predetermined value (G1) (GAIN=GAIN−G1) in step S53, control hunting is controlled and the TPS characteristic abnormality flags are not set. The electronic throttle control apparatus shifts to step S54 and clears the control hunting check flag (FGCHK=0) to perform the processing in step S55 and the subsequent steps.

Figure 10:
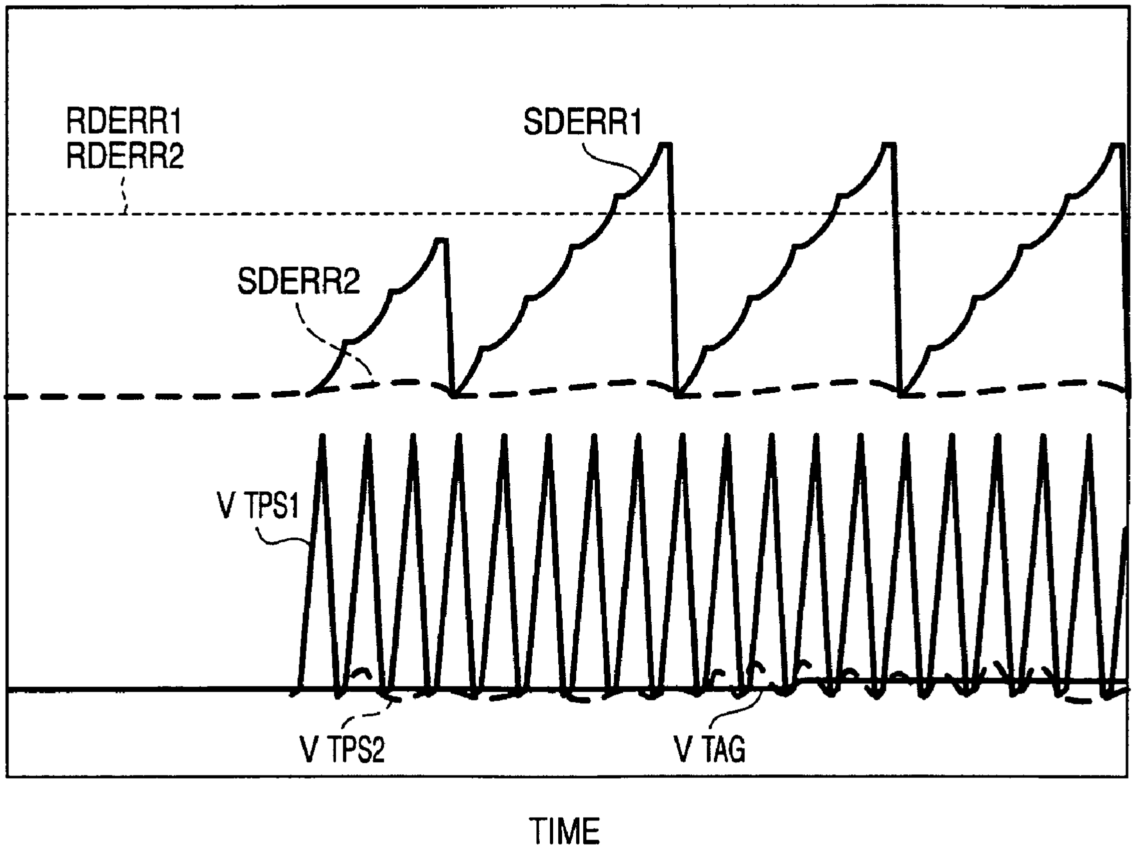
FIG. 10 is a time chart for explaining detection of a characteristic abnormality of the throttle position sensor.

FIG. 10 shows a TPS characteristic abnormality detection time chart at the time of occurrence of output interruption of the first throttle position sensor (TPS1) when a throttle position sensor having the TPS output characteristic A shown in FIG. 4 is used as the throttle position sensor 4.

When interruption of an output terminal of the first throttle position sensor (TPS1) 4*a* occurs, in a sensor input I/F circuit (not shown) in the ECU in FIG. 2, a sensor output signal line is subjected to pull-up processing to a power supply side by a pull-up resistance. Thus, an output signal (VTPS1) of the first throttle position sensor (TPS1) 4*a* rises to a power supply voltage VC side. The throttle control unit generates an operation amount (a control DUTY signal) according to an opening position F/B control arithmetic operation to cause an output signal level of the first throttle position sensor (TPS1) 4*a* to coincide with the target throttle opening signal level, outputs the operation amount to the motor driving circuit 6 to feed a desired current to the motor, and drives the throttle valve 34 in a throttle full close direction.

Therefore, an actual throttle valve rotationally moves in the full close direction and an output signal (VTPS2) of the second throttle position sensor (TPS2) 4*b* fluctuates in the full close direction.

As the output terminal of the first throttle position sensor (TPS1) is restored to a normal state from the interruption, an output signal of the first throttle position sensor (TPS1) 4*a* returns to a signal level at the normal time.

At this point, an actual throttle opening position is driven further to the full close side than the target throttle opening position. Thus, the throttle control unit drives the motor in a direction for returning the actual throttle opening position to the target throttle opening position.

When interruption of the output terminal of the first throttle position sensor (TPS1) 4*a* repeatedly occurs, the same operations are repeated.

Figure 12:
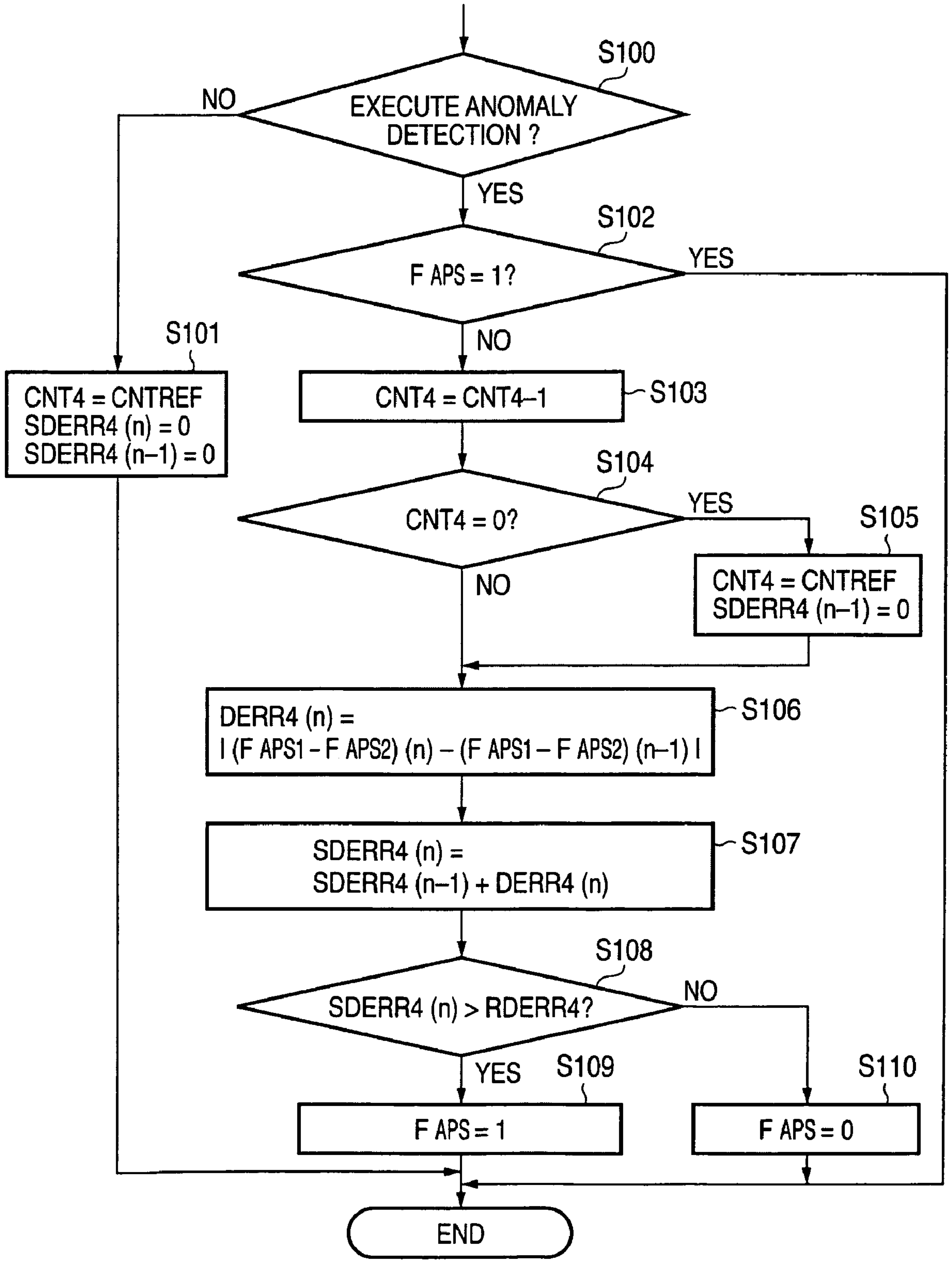
FIG. 12 is a flowchart showing APS characteristic abnormality detection processing procedures in an electronic throttle control apparatus according to a third embodiment of the invention.

Movement of the actual throttle opening position at the time when interruption of the output terminal of the first throttle position sensor occurs repeatedly coincides with fluctuation in the output voltage VTPS2 of the second throttle position sensor (TPS2) 4*b* (in a chart shown in FIG. 12, an output voltage obtained by correcting an offset with respect to VTPS1).

In the time chart described above, the sum (SDERR1) of the change in the control deviation between the target throttle opening value VTAG and the first throttle position sensor output value VTPS1 calculated for each predetermined time (CNTREF) is large. The sum (SDERR2) of the change in the deviation between the target throttle opening value VTAG and the second throttle position sensor output value VTPS2 is small. The sum (SDERR1) of the change in the control deviation between the target throttle opening value VTAG and the first throttle position sensor output value VTPS1 is larger than the predetermined value (RDERR1). The sum (SDERR2) of the change in the deviation between the target throttle opening value VTAG and the second throttle position sensor output value VTPS2 is smaller than the predetermined value (RDERR2). Thus, it is possible to judge whether a TPS characteristic abnormality of the first throttle position sensor (TPS1) 4*a* has occurred.

As explained above, the sensor abnormality detecting method according to this embodiment is a sensor abnormality detecting method that is applied to a control system that detects a control amount of a control object with a sensor, generates an operation amount such that the control amount coincides with a target value that is set according to a control operation state, and outputs the operation amount generated to an actuator to perform feedback control. In the sensor abnormality detecting method, a sum of a change in a control deviation obtained from the target value and the control amount per a predetermined time is calculated and an abnormality of the sensor is detected according to comparison of the sum of the change in the control deviation and the predetermined values set in advance. Thus, it is possible to surely perform abnormality detection for an abnormality such as repeated fluctuation in a sensor output signal at the time of sensor abnormality.

The electronic throttle control apparatus according to this embodiment includes the throttle valve 34 that adjusts an amount of supply air to an internal combustion engine, the throttle position sensor 4 that detects an opening of the throttle valve 34, the throttle actuator 3 that drives the throttle valve 34, the accelerator position sensor 1 that detects an operation amount of an accelerator pedal, the target throttle opening value calculating unit that calculates a target throttle opening value on the basis of an accelerator opening amount detected by the accelerator position sensor 1, the throttle control unit that generates an operation amount such that the target throttle opening value and the opening of the throttle valve 34 detected by the throttle position sensor 4 coincide with each other and outputs the operation amount to the throttle actuator 3 to perform feedback control, and the sensor abnormality detecting unit that calculates, in an operation state in which a change in the target throttle opening value is equal to or smaller than a predetermined value, a sum of a change in a control deviation obtained from the target throttle opening value and the throttle position sensor detection value per a predetermined time and detects an abnormality of the throttle position sensor 4 according to comparison of the sum of the change in the control deviation and a predetermined value set in advance. Thus, it is possible to surely perform abnormality detection for an abnormality such as repeated fluctuation in a sensor output signal at the time of a sensor abnormality due to contact failure or the like of the throttle position sensor 4 and prevent a careless increase in the number of revolution of an internal combustion engine and an engine trouble and secure traveling safety of a vehicle.

The throttle position sensor 4 of the electronic throttle control apparatus according to this embodiment is constituted by the multiple system including the first throttle position sensor 4*a* and the second throttle position sensor 4*b*. The throttle control unit calculates, in an operation state in which the change in the target throttle opening value is equal to or smaller than the predetermined value, a sum of a change in a control deviation obtained from the target throttle opening value and the detection value of the first throttle position sensor 4*a* per a predetermined time and judges, when the sum of the change in the control deviation per the predetermined time is equal to or larger than the predetermined value set in advance, that the first throttle position sensor 4*a* is abnormal, limits the target throttle opening value according to the predetermined value, switches a control amount of the throttle actuator 3 to a detection value of the second throttle position sensor 4*b*, and generates an operation amount such that the detection value of the second throttle position sensor 4*b* coincides with the target throttle opening value and outputs the operation amount to the throttle actuator 3 to perform feedback control. Thus, it is possible to surely perform abnormality detection for the first throttle position sensor 4*a*. Since the target throttle opening value is limited according to the predetermined value at the time of abnormality detection and throttle opening control is performed on the basis of an output value of the normal second throttle position sensor 4*b*, it is possible to prevent a careless increase in the number of revolutions of the internal combustion engine and an engine trouble and secure traveling safety of the vehicle.

The throttle control unit of the electronic throttle control apparatus according to this embodiment judges, when a sum of a change in a control deviation obtained from the target throttle opening value and an opening value detected by the first throttle position sensor 4*a* per a predetermined time is equal to or smaller than the predetermined value and a sum of a change in a deviation obtained from the target throttle opening value and the detection value of the second throttle position sensor 4*b* per a predetermined time is equal to or larger than the predetermined value, that the second throttle position sensor 4*b* is abnormal and limits the target throttle opening value according to the predetermined value. Thus, it is possible to surely perform abnormality detection for the second throttle position sensor 4*b*. Since the target throttle opening value is limited according to the predetermined value at the time of abnormality detection and throttle opening control is performed on the basis of an output value of the normal first throttle position sensor 4*a*, it is possible to prevent a careless increase in the number of revolutions of the internal combustion engine and an engine trouble and secure traveling safety of the vehicle.

The throttle control unit of the electronic throttle control apparatus according to this embodiment judges, when a sum of a change in a control deviation obtained from the target throttle opening value and the detection value of the first throttle position sensor 4*a* per a predetermined time is equal to or larger than the predetermined value and a sum of a change in a deviation obtained from the target throttle opening value and the detection value of the second throttle position sensor 4*b* is equal to or larger than the predetermined value, that control hunting due to the throttle control unit has occurred and lowers the predetermined control gain value to control the control hunting. Thus, even if deterioration of controllability due to unexpected aged deterioration, control disturbance, or the like of an actuator characteristic occurs, the control gain is adjusted to a proper value and it is possible to control the control hunting.

The throttle control unit of the electronic throttle control apparatus according to this embodiment judges, when a sum of a change in a control deviation obtained from the target throttle opening value and an opening value detected by the first throttle position sensor 4*a* per a predetermined time is equal to or larger than the predetermined value and a sum of a change in a deviation obtained from the target throttle opening value and an opening value detected by the second throttle position sensor 4*b* is equal to or larger than the predetermined value, that both the first throttle position sensor 4*a* and the second throttle position sensor 4*b* are abnormal and stops control for the throttle actuator 3 unless the control hunting is controlled even if the predetermined control gain value is lowered. Thus, it is possible to detect multiple failure of the first throttle position sensor 4*a* and the second throttle position sensor 4*b*. Since the throttle is held at the predetermined mechanical opening, it is possible to prevent a careless increase in the number of revolutions of the internal combustion engine and an engine trouble and secure safety at the time of retreat traveling of the vehicle.

Second Embodiment

Figure 11:
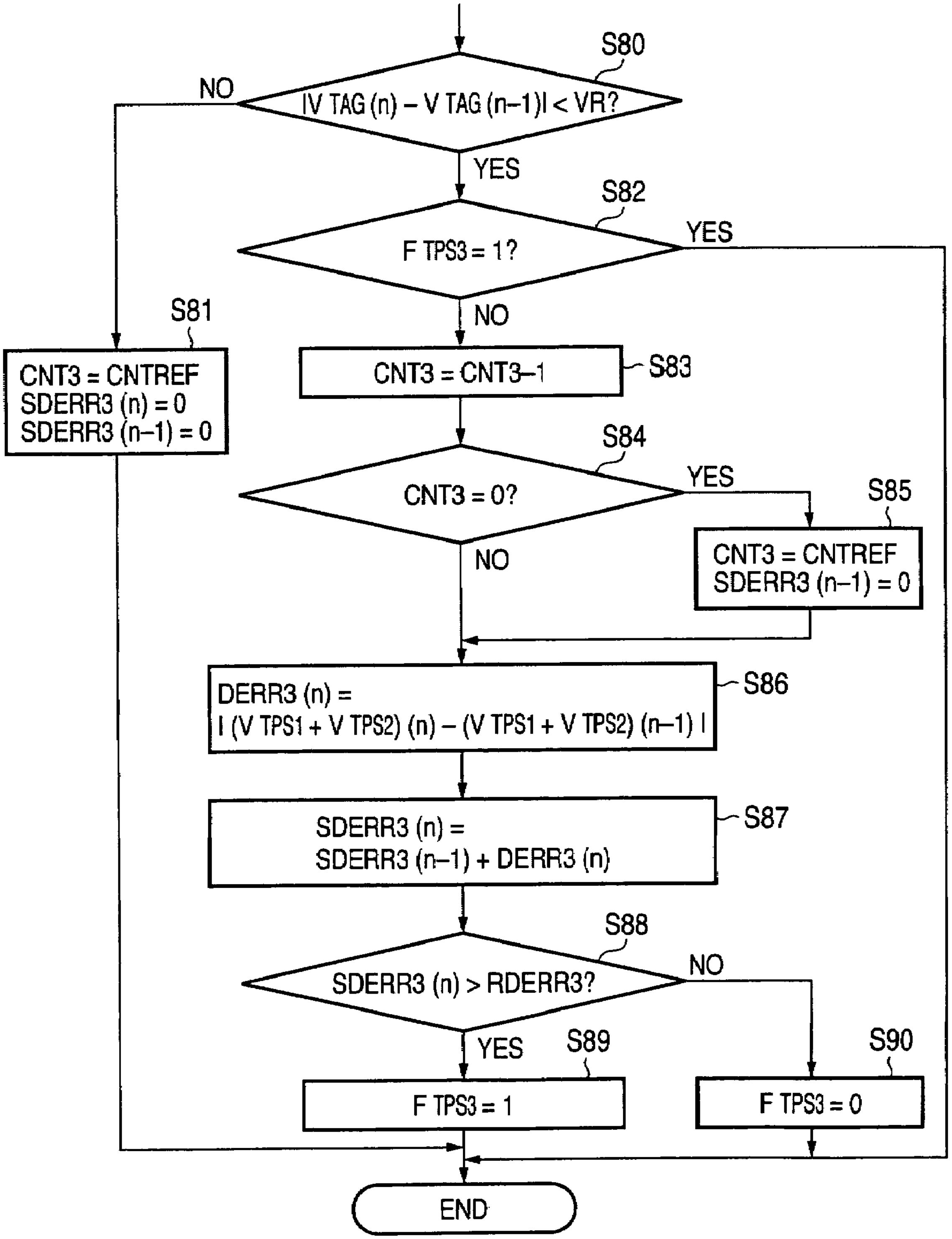
FIG. 11 is a flowchart showing TPS characteristic abnormality detection processing procedures in an electronic throttle control apparatus according to a second embodiment of the invention.

FIG. 11 shows a flow of TPS characteristic abnormality detection processing for a throttle position sensor in an electronic throttle control apparatus according to a second embodiment of the invention. Specifically, FIG. 11 shows a flow of TPS characteristic abnormality detection processing for the throttle position sensor 4 with the TPS output characteristic B (FIG. 5). As the output characteristic B, both the power supply terminal and the GND terminal of the throttle position sensor 4 output a voltage value proportional to a throttle opening as the output voltage VTPS1 of the first throttle position sensor (TPS1) 4*a* and output a voltage value inversely proportional to a throttle opening as the output voltage VTPS2 of the second throttle position sensor (TPS2) 4*b*.

First, the electronic throttle control apparatus judges whether the change (|VTAG(n)−VTAG(n−1)|) of the target throttle opening value VTAG is equal to or smaller than the predetermined value VR as a condition for carrying out the TPS characteristic abnormality detection processing (step S80).

"n" indicates present control period timing in a throttle opening control period.

When the change in the target throttle opening value (|VTAG(n)−VTAG(n−1)|) is equal to or larger than the predetermined value VR, a throttle operation is in a transient state and the TPS characteristic abnormality detection condition is not satisfied. Thus, the electronic throttle control apparatus initializes a timer counter value measuring time for calculating a sum of a change in a control deviation calculated from the target throttle opening value VTAG and the actual throttle opening value VTPS1 (CNT3=CNTREF), clears a sum of a change in an added value of an output voltage of the first throttle position sensor (TPS1) 4*a* and an output voltage of the second throttle position sensor (TPS2) 4*b* {SDERR3(*n*), SDERR3(*n*−1)}, and ends the processing (step S81).

When the change in the target throttle opening value (|VTAG(n)−VTAG(n−1)|) is equal to or smaller than the predetermined value VR, the throttle position sensor 4 performs TPS characteristic abnormality detection processing.

The electronic throttle control apparatus judges according to a TPS characteristic abnormality judgment flag FTPS3 whether TPS characteristic abnormality detection processing is performed (step S82).

When the TPS characteristic abnormality judgment flag is set (FTPS3=1), since the TPS has already been subjected to characteristic abnormality judgment, the electronic throttle control apparatus ends the processing.

When the TPS characteristic abnormality judgment flag is reset (FTPS3=0), the electronic throttle control apparatus decrements a timer counter CNT3 measuring time for calculating a sum of a change in an added value of the first throttle position sensor output value VTPS1 and the second throttle position sensor output value VTPS2 (step S83). The electronic throttle control apparatus judges whether the time for calculating the sum of the change in the added value of the first throttle position sensor output value VTPS1 and the second throttle position sensor output value VTPS2 has reached the predetermined time (CNTREF) (step S84). When the predetermined time has elapsed, the electronic throttle control apparatus sets the timer counter CNT3 to the predetermined value CNTREF and clears a sum SDERR3($n$−1) of a change in an added value of both the TPS output added values calculated until the last control period (step S85).

The electronic throttle control apparatus calculates a change DERR3($n$) in an added value of both the TPS output values in the present control period according to an absolute value of a difference between a present added value of both the TPS outputs (VTPS1+VTPS2) and a last added value of both the TPS outputs (VTPS1+VTPS2)($n$−1) (step S86). The electronic throttle control apparatus adds the change DERR3($n$) to the sum SDERR3($n$−1) of the change in the added value of both the TPS outputs calculated until the last control period to calculate a sum SDERR3($n$) of a change in an added value of both the TPS outputs calculated until the present control period (step S87). The electronic throttle control apparatus compares the sum SDERR3($n$) of the change in the added value of both the TPS outputs with the predetermined value RDERR3 for TPS characteristic abnormality judgment (step S88). When the sum SDERR3($n$) is equal to or larger than the predetermined value RDERR3, the electronic throttle control apparatus judges that the first throttle position sensor 4$a$ or the second throttle position sensor 4$b$ is abnormal and sets a characteristic abnormality flag of TPS (FTPS3=1) (step S89). When the sum SDERR3($n$) is equal to or smaller than the predetermined value RDERR3, the electronic throttle control apparatus resets the characteristic abnormality flag (FTPS3=0) (step S90) and ends the processing.

Note that, when the electronic throttle control apparatus judges that the first throttle position sensor 4$a$ or the second throttle position sensor 4$b$ is abnormal, the electronic throttle control apparatus stops control for the throttle actuator 3.

As explained above, in the sensor abnormality detecting apparatus according to this embodiment, the throttle position sensor 4 is constituted by the multiple system including the first throttle position sensor 4$a$ and the second throttle position sensor 4$b$ using the power supply and the sensor ground in common. An opening value detected by the first throttle position sensor 4$a$ and an opening value detected by the second throttle position sensor 4$b$ change in opposite manners because of a change in an opening of the throttle valve 34. The throttle control unit calculates a sum of a change in an added value of a first throttle position sensor detection value and a second throttle position sensor detection value per a predetermined time. When a sum of a change in an added value of the opening value detected by the first throttle position sensor 4$a$ and the opening value detected by the second throttle position sensor 4$b$ is equal to or larger than a predetermined value, the throttle control unit judges that the first throttle position sensor 4$a$ or the second throttle position sensor 4$b$ is abnormal and stops control for the throttle actuator 3. Thus, it is possible to surely detect an abnormality of fluctuation in an output signal due to contact failure in a power supply terminal or a ground terminal of a throttle position sensor with two sensor output systems using a sensor power supply and a contact terminal in common.

Third Embodiment

FIG. 12 is a flowchart showing a flow of APS characteristic abnormality detection processing for an accelerator position sensor (APS) in an electronic throttle control apparatus according to a third embodiment of the invention.

First, the electronic throttle control apparatus judges whether a not-shown ignition switch (IG switch) is ON as a condition for carrying out the APS characteristic abnormality detection processing (step S100).

"n" indicates present sampling timing in a sampling period of an accelerator opening signal.

When the IG switch is OFF, the APS characteristic abnormality detection condition is not satisfied. Thus, the electronic throttle control apparatus initializes a timer counter value measuring time for calculating a sum of a change in a deviation of both APS output voltages of the first accelerator opening value VAPS1 and the second accelerator opening value VAPS2 (CNT4=CNTREF), clears a sum of a change in a deviation of both the APS output voltages {SDERR4($n$), SDERR4($n$−1)}, and ends the processing (step S101).

When the IG switch is ON, the electronic throttle control apparatus performs APS characteristic abnormality detection processing.

The electronic throttle control apparatus judges according to an APS characteristic abnormality judgment flag FAPS whether APS characteristic abnormality detection processing is performed (step S102).

When the APS characteristic abnormality judgment flag is set (FAPS=1), since the APS (accelerator position sensor) has already been subjected to characteristic abnormality judgment, the electronic throttle control apparatus ends the processing.

When the APS characteristic abnormality judgment flag is reset (FAPS=0), the electronic throttle control apparatus decrements a timer counter CNT4 measuring time for calculating a sum of a change in a deviation of voltages of the first accelerator position sensor output value VAPS1 and the second accelerator position sensor output value VAPS2 (step S103). The electronic throttle control apparatus judges whether the time for calculating the sum of the change in the deviation of voltages of the first accelerator position sensor output value VAPS1 and the second accelerator position sensor output value VAPS2 has reached the predetermined time (CNTREF) (step S104). When the predetermined time has elapsed, the electronic throttle control apparatus sets the timer counter CNT4 to the predetermined value CNTREF and clears a sum SDERR4($n$−1) of a change in a deviation of both the APS output voltages calculated until the last control period (step S105).

The electronic throttle control apparatus calculates a change DERR4($n$) in a deviation of output voltages of the first accelerator position sensor (APS1) 1$a$ and the second accelerator position sensor (APS2) 1$b$ at the present sampling timing according to an absolute value of a difference between a present deviation of both the APS output voltages (VAPS1−VAPS2)($n$) and a last deviation of both the APS output voltages (VAPS1−VAPS2)($n$−1) (step S106). The electronic throttle control apparatus adds the change DERR4($n$) to the sum SDERR4($n$−1) of the change in the deviation of both the APS output voltages calculated until the last sampling timing to calculate a sum SDERR4($n$) of a change in a deviation of both the APS output voltages calculated until the present sampling timing (step S107). The electronic throttle control apparatus compares the sum SDERR4($n$) of the change in the deviation of both the APS output voltages with the predetermined value RDERR4 for APS characteristic abnormality judgment (step S108). When the sum SDERR4($n$) is equal to or larger than the predetermined value RDERR4, the electronic throttle control apparatus judges that the first accelerator position sensor 1*a* or the second accelerator position sensor 1*b* is abnormal and sets an APS characteristic abnormality flag (FAPS=1) (step S109). When the sum SDERR4($n$) is equal to or smaller than the predetermined value RDERR4, the electronic throttle control apparatus resets the APS characteristic abnormality flag (FAPS=0) (step S110) and ends the processing.

As failsafe processing at the time of the APS characteristic abnormality judgment in which the APS characteristic abnormality flag is set (FAPS=1), the electronic throttle control apparatus stops control for the throttle actuator 3 (interrupts energization to the motor) and keeps a throttle opening to a predetermined mechanical opening to perform retreat traveling.

As explained above, in the electronic throttle control apparatus according to this embodiment, the accelerator position sensor for detecting an operation amount of an accelerator pedal is constituted by the multiple system including the first accelerator position sensor 1*a* and the second accelerator position sensor 1*b*. The electronic throttle control apparatus calculates a sum of a change in a deviation obtained from a detection value of the first accelerator position sensor 1*a* and a detection value of the second accelerator position sensor 1*b* per a predetermined time. When the sum of the change in the deviation obtained from the detection value of the first accelerator position sensor 1*a* and the detection value of the second accelerator position sensor 1*b* per the predetermined time is equal to or larger than a predetermined value, the electronic throttle control apparatus judges that the first accelerator position sensor 1*a* or the second accelerator position sensor 1*b* is abnormal and stops control for the throttle actuator 3. Thus, it is possible to surely perform abnormality detection for an abnormality of fluctuation in a sensor output signal due to contact failure or the like of the first accelerator position sensor 1*a* or the second accelerator position sensor 1*b*. Since the throttle is kept at a predetermined mechanical opening at the time when an abnormality is detected, it is possible to prevent a careless increase in the number of revolutions of the internal combustion engine and an engine trouble and secure safety at the time of retreat traveling of the vehicle.

Note that, in this embodiment, the advantages of the invention are explained using the throttle position sensor and the accelerator position sensor of the contact type as examples. However, the same advantages are obtained when the invention is applied to a non-contact type sensor using a Hall IC or the like in a sensor detection unit.

The characteristic abnormality detection for the throttle position sensor is performed according to comparison of a sum of a change in a deviation of voltages between a target throttle opening signal and a throttle position sensor detection value and a predetermined value. However, the same advantages are obtained when the characteristic abnormality detection is carried out according to comparison of a sum of a change in a difference of both the sensor output voltages and a predetermined value.

It is well-known that the characteristic abnormality detection time (CNTREF) of the TPS and the APS is reduced to judge that an abnormality has occurred when the number of times the sum (SDERR1) of the change in the control deviation is equal to or larger than the predetermined value (RDERR1) is equal to or larger than a predetermined number of times. It is also well-known that the same advantages are obtained when the invention is applied to the throttle position sensor having a single output.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An electronic throttle control apparatus comprising:

a throttle valve that adjusts an amount of supply air to an internal combustion engine;

a throttle position sensor that detects an opening of the throttle valve;

a throttle actuator that drives the throttle valve;

an accelerator position sensor that detects an operation amount of an accelerator pedal;

a target throttle opening value calculating unit that calculates a target throttle opening value on the basis of an accelerator opening amount detected by the accelerator position sensor;

a throttle control unit that generates an operation amount such that the target throttle opening value and the opening of the throttle valve detected by the throttle position sensor coincide with each other and outputs the operation amount to the throttle actuator to perform feedback control; and a sensor abnormality detecting unit that calculates, in an operation state in which a change in the target throttle opening value is equal to or smaller than a predetermined value, a sum of an absolute value of a change in a control deviation obtained from the target throttle opening value and the throttle position sensor detection value per a predetermined time and detects an abnormality of the throttle position sensor according to comparison of the sum of the absolute value of the change in the control deviation and a predetermined value set in advance.

2. An electronic throttle control apparatus according to claim 1, wherein the throttle position sensor is constituted by a multiple system including a first throttle position sensor and a second throttle position sensor, and the throttle control unit calculates, in an operation state in which the change in the target throttle opening value is equal to or smaller than the predetermined value, a sum of an absolute value of a change in a control deviation obtained from the target throttle opening value and the detection value of the first throttle position sensor per the predetermined time and judges, when the sum of the absolute value of the change in the control deviation per the predetermined time is equal to or larger than the predetermined value set in advance, that the first throttle position sensor is abnormal, limits the target throttle opening value according to the predetermined value, switches a control amount of the throttle actuator to a detection value of the second throttle position sensor, and generates an operation amount such that the detection value of the second throttle position sensor coincides with the target throttle opening value and outputs the operation amount to the throttle actuator to perform feedback control.

3. An electronic throttle control apparatus according to claim 2, wherein the throttle control unit judges, when a sum of an absolute value of change in a control deviation obtained from the target throttle opening value and an opening value detected by the first throttle position sensor per the predetermined time is equal to or smaller than the predetermined value and a sum of an absolute value of a change in a deviation obtained from the target throttle opening value and the detection value of the second throttle position sensor per the predetermined time is equal to or larger than the predetermined value, that the second throttle position sensor is abnormal and limits the target throttle opening value according to the predetermined value.

4. An electronic throttle control apparatus according to claim 2, wherein the throttle control unit judges, when the sum of the absolute value of the change in the control deviation obtained from the target throttle opening value and the detection value of the first throttle position sensor per the predetermined time is equal to or larger than the predetermined value and a sum of an absolute value of a change in a deviation obtained from the target throttle opening value and the detection value of the second throttle position sensor is equal to or larger than the predetermined value, that control hunting due to the throttle control unit has occurred and lowers a predetermined control gain value to control the control hunting.

5. An electronic throttle control apparatus according to claim 4, wherein the throttle control unit judges, when a sum of an absolute value of a change in a control deviation obtained from the target throttle opening value and an opening value detected by the first throttle position sensor per the predetermined time is equal to or larger than the predetermined value and a sum of an absolute value of a change in a deviation obtained from the target throttle opening value and an opening value detected by the second throttle position sensor is equal to or larger than the predetermined value, that both the first throttle position sensor and the second throttle position sensor are abnormal, unless control hunting is controlled, even if the predetermined control gain value is lowered and stops control for the throttle actuator.

6. An electronic throttle control apparatus according to claim 1, wherein the throttle position sensor is constituted by a multiple system including a first throttle position sensor and a second throttle position sensor using a power supply and a sensor ground in common, an opening value detected by the first throttle position sensor and an opening value detected by the second throttle position sensor change in opposite manners because of a change in an opening of the throttle valve, and the throttle control unit calculates a sum of an absolute value of a change in an added value of a first throttle position sensor detection value and a second throttle position sensor detection value per the predetermined time, judges, when the sum of the absolute value of a change in an added value of the opening value detected by the first throttle position sensor and the opening value detected by the second throttle position sensor is equal to or larger than the predetermined value, that the first throttle position sensor or the second throttle position sensor is abnormal, and stops control for the throttle actuator.

7. An electronic throttle control apparatus according to claim 1, wherein the accelerator position sensor for detecting an operation amount of an accelerator pedal is constituted by a multiple system including a first accelerator position sensor and a second accelerator position sensor, and the electronic throttle control apparatus calculates a sum of an absolute value of a change in a deviation obtained from a detection value of the first accelerator position sensor and a detection value of the second accelerator position sensor per the predetermined time, judges, when the sum of the absolute value of the change in the deviation obtained from the detection value of the first accelerator position sensor and the detection value of the second accelerator position sensor per the predetermined time is equal to or larger than the predetermined value, that the first accelerator position sensor or the second accelerator position sensor is abnormal, and stops control for the throttle actuator.

* * * * *